(12) United States Patent
Lee et al.

(10) Patent No.: US 9,136,941 B2
(45) Date of Patent: Sep. 15, 2015

(54) OPTICAL LAYER MONITORING APPARATUS AND METHOD THEREOF

(71) Applicant: Electronics and Telecommunications Research Institute, Daejeon-si (KR)

(72) Inventors: Han-Hyub Lee, Daejeon-si (KR); Seung-Il Myong, Daejeon-si (KR); Eui-Suk Jung, Daejeon-si (KR); Sang-Soo Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 194 days.

(21) Appl. No.: 13/838,309

(22) Filed: Mar. 15, 2013

(65) Prior Publication Data
US 2013/0294768 A1 Nov. 7, 2013

(30) Foreign Application Priority Data
May 2, 2012 (KR) ........................ 10-2012-0046575

(51) Int. Cl.
*H04B 10/08* (2006.01)
*H04B 10/071* (2013.01)

(52) U.S. Cl.
CPC .................................. *H04B 10/071* (2013.01)

(58) Field of Classification Search
CPC .... H04B 10/071; H04B 10/07; H04B 10/073; H04B 10/077; H04B 10/0771; H04B 10/0773; H04B 10/0775; H04B 10/0793; H04B 10/0795; H04B 10/07955
USPC .............. 398/9–36, 135, 138, 139, 128, 130
See application file for complete search history.

(56) References Cited

U.S. PATENT DOCUMENTS

| | | | |
|---|---|---|---|
| 7,620,327 B2* | 11/2009 | Snawerdt | 398/164 |
| 2011/0013904 A1 | 1/2011 | Khermosh et al. | |
| 2012/0020672 A1* | 1/2012 | Aguren | 398/139 |
| 2012/0243863 A1* | 9/2012 | Zhao et al. | 398/16 |
| 2013/0259469 A1* | 10/2013 | Smith et al. | 398/16 |

FOREIGN PATENT DOCUMENTS

EP  WO 2011/147030  * 12/2011 ............. H04B 10/08

OTHER PUBLICATIONS

Hehmann, Jorg et al., "New Monitoring Concepts for Optical Access Networks," Bell Labs Technical Journal, vol. 13 (1):183-198 (2008).

* cited by examiner

*Primary Examiner* — M R. Sedighian
(74) *Attorney, Agent, or Firm* — Nelson Mullins Riley & Scarborough LLP; Anthony A. Laurentano, Esq.

(57) ABSTRACT

An optical layer monitoring apparatus and method thereof are provided. According to an embodiment of the present invention, an optical layer monitoring apparatus including an optical time domain reflectometer (OTDR) function so as to monitor an optical path of a passive optical network (PON), and a method for improving accuracy of measured monitoring results using the optical layer monitoring apparatus are provided. Therefore, it is possible to enable a user to continuously detect distortion or attenuation along the optical path, and to quickly recover from the distortion or attenuation along the optical path when distortion or attenuation is detected.

14 Claims, 14 Drawing Sheets

(a) SINGLE PULSE SCHEME (b) CODED PULSE SCHEME (a)

(b)

OPTICAL LAYER MONITORING APPARATUS AND METHOD THEREOF

CROSS-REFERENCE TO RELATED APPLICATION

This application claims the benefit under 35 U.S.C. §119(a) of a Korean Patent Application No. 10-2012-0046575, filed on May 2, 2012, the entire disclosure of which is incorporated herein by reference for all purposes.

BACKGROUND

1. Field

The following description relates to passive optical network (PON) technology, and more particularly, to optical layer monitoring technology in a PON.

2. Description of the Related Art

Along with an increase in demand for broadband services such as VOD, CATV, or HDTV, a passive optical network (PON) for supplying high speed and large volume data services to subscribers has been actively constructed. As representative PON technology, time division multiplexing PON technology in which subscribers of several communication services share and use downstream signals and upstream signals which have the same wavelength, and transmit the upstream signals to a telephone company of network service providers only in a use band allocated over time, may be given. As a representative example of time division multiplexing PON technology, Ethernet PON (EPON), Giga-capable PON (GPON), or the like, may be given. Also, as representative PON technology, wavelength division multiplexing PON (WDM-PON) technology in which a plurality of subscribers use downstream signals and upstream signals which have different wavelengths, may be given.

In such a PON, an optical transmission apparatus used in the telephone company side of a network service provider, and an optical transmission apparatus used in the communication service subscriber side are connected with each other using an optical fiber as a transmission medium of signals. Accordingly, in order to reliably operate a PON, the network service provider should continuously monitor the operational status of an optical path so as to detect distortion or attenuation, and to quickly recover from the distortion or attenuation along the optical path when distortion or attenuation is detected. In addition, during the optical path monitoring and distortion or attenuation recovery process, it is preferable that services provided to the subscribers are not broken or disrupted.

As an optical layer monitoring apparatus for solving these problems, an optical time-domain reflectometer (OTDR) is widely used. OTDR is an apparatus that makes an OTDR signal including optical pulses, incident on an optical path to be monitored, receives a backward scattering signal generated along the optical path due to the OTDR signal, and then analyzes the received signal over time to thereby measure a loss in accordance with a length of the optical path, a position of a connection point, a connection loss, and the like.

SUMMARY

The following description relates to an optical layer monitoring apparatus and method which may continuously detect distortion or attenuation along an optical path, and quickly recover from the distortion or attenuation along the optical path when distortion or attenuation is detected.

In one general aspect, an optical layer monitoring apparatus in a passive optical network (PON), includes: an optical time domain reflectometer (OTDR) signal transceiver unit that transmits an OTDR signal that is a monitoring signal to an optical path, and receives the OTDR signal backscattered or reflected from the optical path; and an OTDR signal processing unit that distributes a received power monitoring section of the received OTDR signal, measures reverse diffusion energy of each of reception pulse trains for each received power monitoring section, and adds the measured reverse diffusion energy of each of the reception pulse trains, while processing the OTDR signal transmitted or received through the OTDR signal transceiver unit.

In another general aspect, an optical layer monitoring method of an optical layer monitoring apparatus in a PON, includes: transmitting an OTDR signal along an optical line, and receiving the OTDR signal backscattered or reflected from the optical path; and distributing a received power monitoring section of the received OTDR signal, measuring reverse diffusion energy of each of reception pulse trains for each received power monitoring section, and adding the measured reverse diffusion energy of each of the reception pulse trains, while processing the received OTDR signal.

Other features and aspects will be apparent from the following detailed description, the drawings, and the claims.

Figure 1:
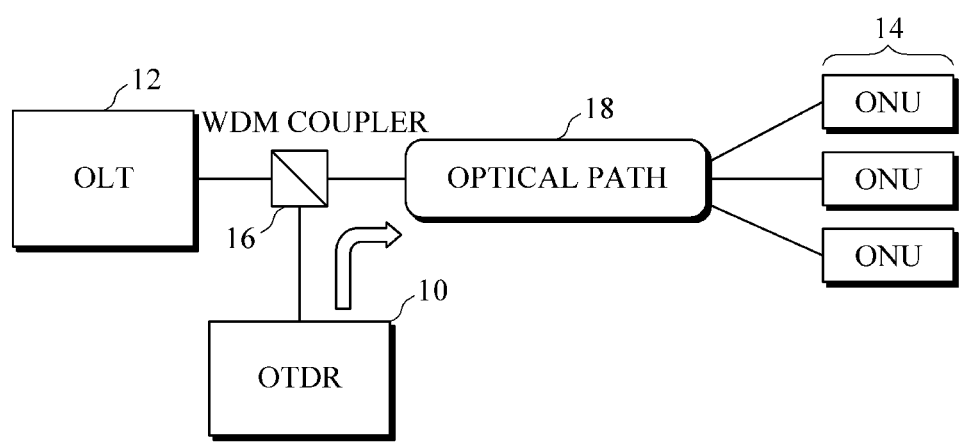
FIG. 1 is a reference diagram showing an example of monitoring an optical path using an optical time domain reflectometer (OTDR) applied to the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a reference diagram showing an example of monitoring an optical path using an OTDR applied to the present invention.

Referring to FIG. 1, in a passive optical network (PON) that includes an optical transmission apparatus used in the telephone company side of a network service provider, for example, an optical line terminal (OLT) 12, and an optical transmission apparatus used in the communication service subscriber side, for example, an optical network unit (ONU) 14, an optical time domain reflectometer (hereinafter, referred to as "OTDR") 10 makes an OTDR signal that is a monitoring signal, incident on an optical path 18. In this instance, the OTDR signal is made incident along the optical path 18 using a WDM coupler 16 for coupling signals with mutually different wavelengths. In general, the OTDR 10 uses a wavelength band of 1.6 um that is defined in ITU-T standard document (ITU-T L.66) as an OTDR signal wavelength. This wavelength band has a large wavelength spacing from a data signal wavelength band (1.3 um or 1.5 um) mainly used in the PON, and therefore less interference between the OTDR signal and the data signal is generated.

FIG. 2 is a reference diagram showing results obtained by monitoring an optical path using the OTDR 10.

Figure 2A:
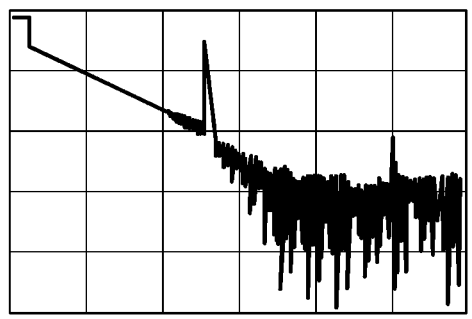
FIGS. 2A and 2B are reference diagrams showing results obtained by monitoring an optical path using an OTDR.
Figure 2B:

In FIG. 2, an X-axis indicates a distance and a Y-axis indicates the intensity of a reflected signal. When monitoring an optical path using the OTDR 10, information such as a loss change along the optical path in accordance with a distance, a light reflection quantity at a specific point, a length of the entire optical path, and the like, as shown in FIG. 2, may be obtainable. In this instance, a difference in the measurement results in accordance with a monitoring performance of the used OTDR 10 may be generated, as shown in FIGS. 2A and 2B. When the OTDR 10 has a superior monitoring performance, a monitoring distance may be increased, as shown in FIG. 2B.

According to an embodiment of the present invention, an optical layer monitoring apparatus including an OTDR function so as to monitor the optical path of PON, and a method for improving accuracy of monitoring results measured using the optical layer monitoring apparatus, are provided. In particular, the optical layer monitoring apparatus which has the OTDR function required for monitoring an optical layer of the optical path for PON, minimizes structural change of an optical transmission apparatus of the telephone company side of a network service provider, and improves accuracy of monitoring results using OTDR, an optical transceiver including the optical layer monitoring apparatus function, an optical transmission apparatus, and a method of processing monitoring signals thereof, are provided.

Hereinafter, a structure of an optical layer monitoring apparatus including an OTDR function will be described in detail according to a variety of embodiments of the present invention with reference to FIGS. 3 to 5, and a variety of methods for improving accuracy of monitoring results using OTDR by an optical layer monitoring apparatus will be described in detail with reference to FIGS. 6 to 12.

Figure 3:
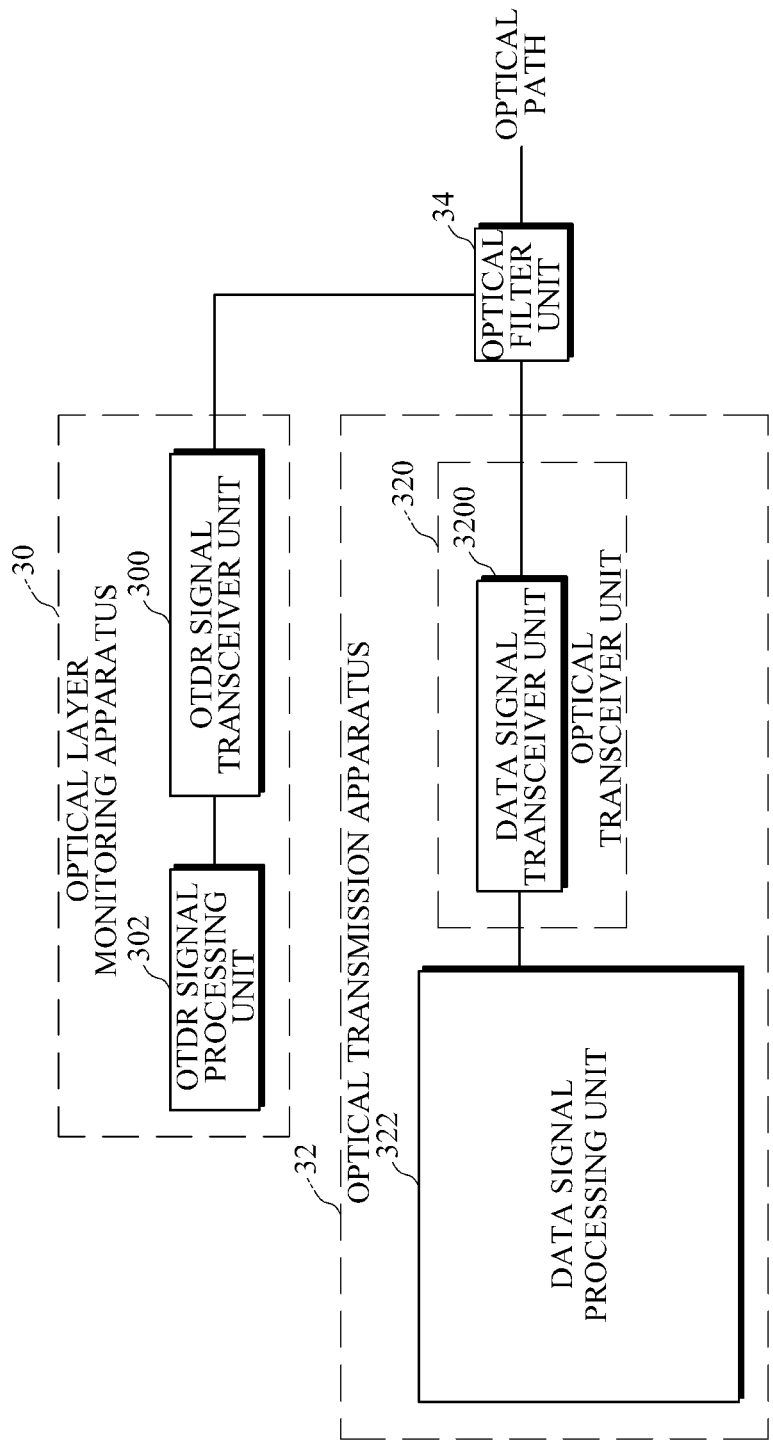
FIG. 3 is a block diagram showing a connection relationship between an optical layer monitoring apparatus including an OTDR function and an optical transmission apparatus according to a first embodiment of the present invention.

FIG. 3 is a block diagram showing a connection relationship between an optical layer monitoring apparatus 30 including an OTDR function and an optical transmission apparatus 32 according to a first embodiment of the present invention.

The optical layer monitoring apparatus 30 according to the first embodiment of the present invention includes an OTDR signal processing unit 302 and an OTDR signal transceiver unit 300, and the optical transmission apparatus 32 includes an optical transceiver unit having a data signal transceiver unit 3200 and a data signal processing unit 322.

The OTDR signal transceiver unit 300 of the optical layer monitoring apparatus 30 transmits an OTDR signal that is a monitoring signal to an optical path, and receives the OTDR signal backscattered or reflected from the optical path. The OTDR signal transmitted through the OTDR signal transceiver unit is transmitted through an optical filter unit 34 and then made incident along the optical path. The OTDR reflection signal generated along the optical path is transmitted to the OTDR signal transceiver unit 300, converted into an electrical signal, and then input to the OTDR signal processing unit 302. The OTDR signal processing unit 302 processes the OTDR signal transmitted and received through the OTDR signal transceiver unit 300.

The data signal transceiver unit 3200 of the optical transmission apparatus 32 transmits and receives a data signal through the optical path, and the data signal processing unit 322 processes the data signal transmitted and received through the data signal transceiver unit 3200. The optical transmission apparatus 32 may be an OLT positioned in the telephone company side of a network service provider.

According to an embodiment of the present invention, in a PON including the optical transmission apparatus 32 and a plurality of ONUs connected to the optical path, the optical layer monitoring apparatus 30 is connected with the optical path using the optical filter unit 34.

The optical filter unit 34 connects the data signal transceiver unit 3200 and the OTDR signal transceiver unit 300. In this instance, the optical filter unit 34 may connect the data signal transmitted and received through the data signal transceiver unit 3200 and the OTDR signal transmitted through the OTDR signal transceiver unit 300 using a wavelength division multiplexing method.

As an example of the data signal processing unit 322, a medium access controller (MAC) may be given, and as an example of the data signal transceiver unit 3200, an optical transceiver may be given. As an example of MAC, an MAC for EPON OLT, an MAC for 10 G EPON OLT G-PON OLT system, or a MAC for 10 G G-PON OLTMAC, may be given. As an example of the optical transceiver, an optical transceiver for EPON OLT system, an optical transceiver for 10 G EPON OLT system, an optical transceiver for G-PON OLT, or an optical transceiver for 10 G G-PON OLT, may be given.

Figure 4:
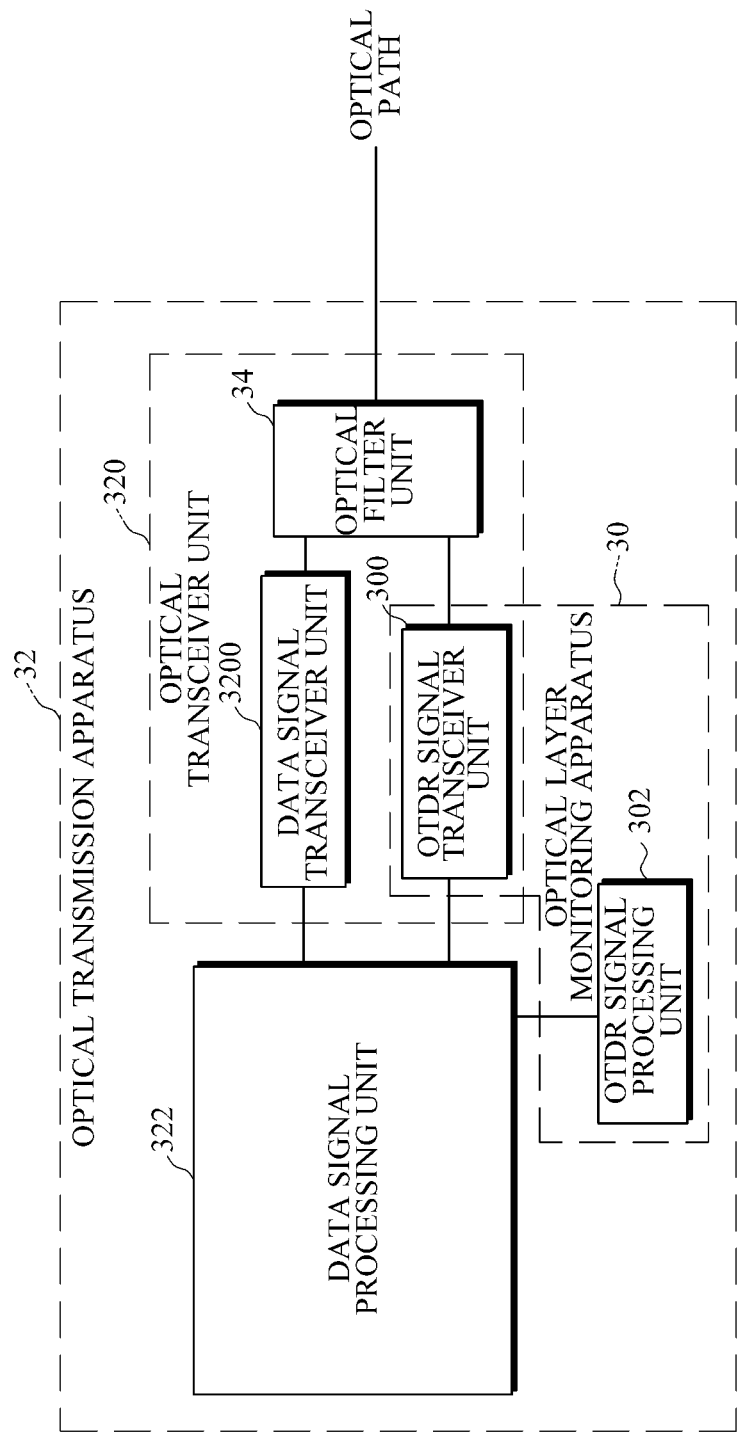
FIG. 4 is a block diagram showing a connection relationship between an optical layer monitoring apparatus including an OTDR function and an optical transmission apparatus according to a second embodiment of the present invention.

FIG. 4 is a block diagram showing a connection relationship between the optical layer monitoring apparatus 30 including an OTDR function and the optical transmission apparatus 32 according to a second embodiment of the present invention.

The optical layer monitoring apparatus 30 according to the second embodiment of the present invention has a structure in which the OTDR signal transceiver unit 300 and the OTDR signal processing unit 302 are separated. That is, only the OTDR signal transceiver unit 300 of both the OTDR signal transceiver unit 300 and the OTDR signal processing unit 302 of the optical layer monitoring apparatus 30, may be included in the optical transceiver unit 320.

The optical transceiver unit 320 includes the data signal transceiver unit 3200, the OTDR signal transceiver unit 300, and the optical filter unit 34. Optical signals transmitted from the data signal transceiver unit 3200 and the OTDR signal transceiver unit 300 are subjected to wavelength multiplexing through the optical filter unit 34, and then made incident along the optical path.

The OTDR signal transceiver unit 300 and the OTDR signal processing unit 302 which are included in the optical transmission apparatus 32, are connected with the data signal processing unit 322. In this instance, the data signal processing unit 322, the OTDR signal processing unit 302, and the OTDR signal transceiver unit 300 are connected with each other using a simple input/output protocol such as I2C or the like, thereby minimizing hardware connection required for operating the optical layer monitoring apparatus 30 of the data signal processing unit 322.

Figure 5:
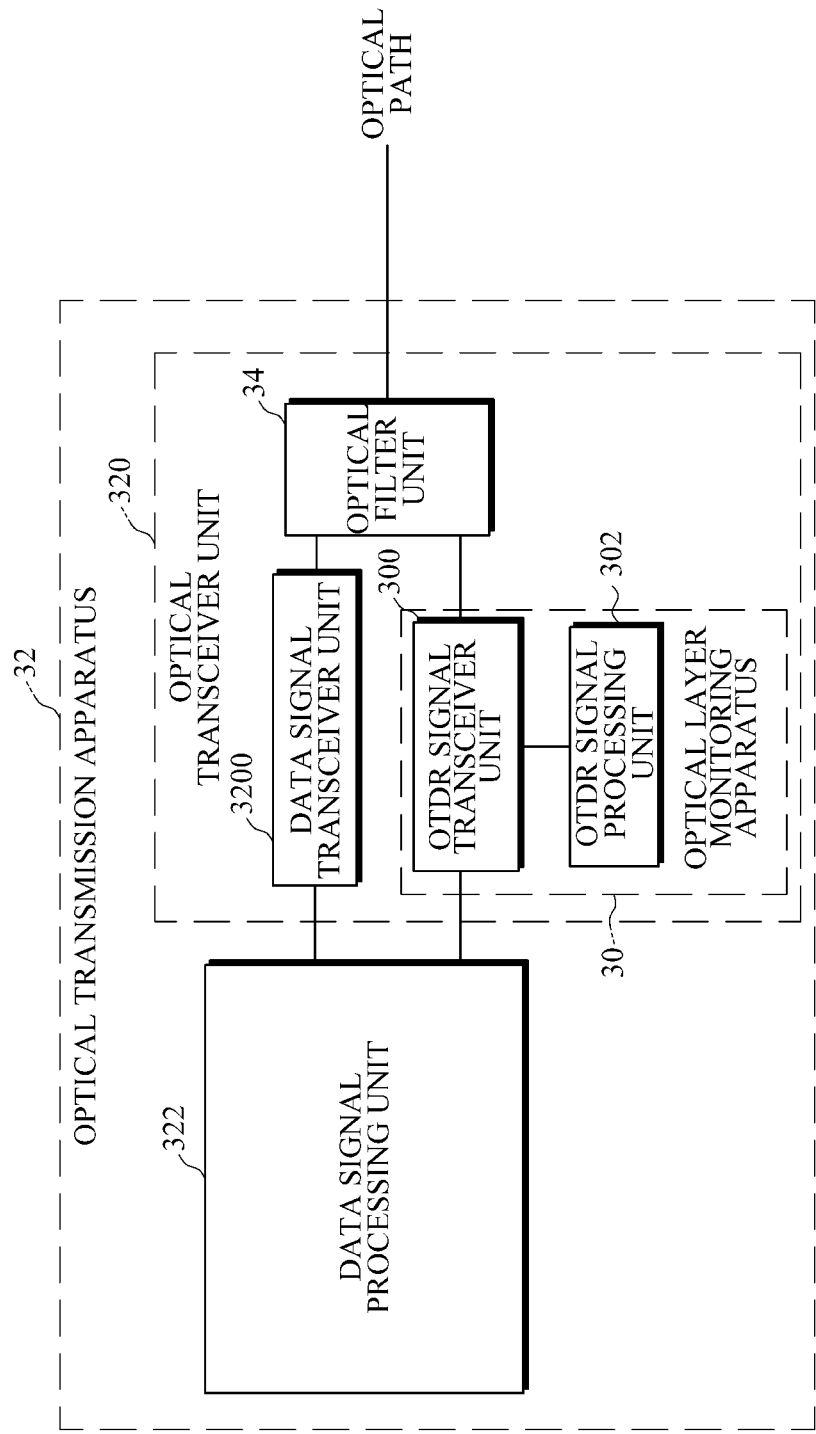
FIG. 5 is a block diagram showing a connection relationship between an optical layer monitoring apparatus including an OTDR function and an optical transmission apparatus according to a third embodiment of the present invention.

FIG. 5 is a block diagram showing a connection relationship between the optical layer monitoring apparatus 30 including an OTDR function and the optical transmission apparatus 32 according to a third embodiment of the present invention.

The optical layer monitoring apparatus 30 according to the third embodiment of the present invention has a structure in which the OTDR signal processing unit 302 and the OTDR signal transceiver unit 300 are connected, and both the OTDR signal processing unit 302 and the OTDR signal transceiver unit 300 of the optical layer monitoring apparatus 30 are included in the optical transceiver unit 320. In this instance, optical signals having mutually different wavelengths which are output from the data signal transceiver unit 3200 and the OTDR signal transceiver unit 300, are subjected to wavelength multiplexing through the optical filter unit 34, and then made incident along the optical path. The OTDR signal processing unit 302 may be implemented into a micro-semiconductor that is fabricated in a CMOS method, in order to minimize a size of the OTDR signal processing unit 302.

The optical transmission apparatus 32 including the optical layer monitoring apparatus 30 according to the above-described various embodiments may use an MAC as the data signal processing unit 322 because there is no change in the structure of the data signal processing unit 322. In general, in the optical transmission apparatus for PON, an operational proportion of the MAC is higher than other components. Accordingly, as described above, when a commercial MAC is used, a change in the structure of the data signal processing unit 322 is minimized, and an optical layer monitoring function is added, it is possible to improve manufacturing and use convenience of the optical transmission apparatus 32.

According to an embodiment, optical elements used in the optical transceiver unit 320 of the optical layer monitoring apparatus 30 may be miniaturized using optical integrated circuit technology. Optical integrated circuit technology is technology of integrating an electronic element and an optical element on a single substrate including a semiconductor made of gallium arsenide (GaAs) or indium phosphide (InP). Through optical integrated circuit technology, reduction in size and weight of the apparatus, increase in the operating speed in accordance with IC, reduction in an operation voltage, and reduction in costs may be achieved.

Hereinafter, methods for improving monitoring performance of the optical layer monitoring apparatus 30 according to a variety of embodiments of the present invention will be described in detail.

As major performance indicators representing the monitoring performance of the optical layer monitoring apparatus 30, a dynamic range and resolution may be used. The dynamic range is determined by the intensity of an output signal of an optical transmitter, and reception sensitivity of an optical receiver. The OTDR receives optical signals scattered or reflected from an optical path in a unit of time, and draws monitoring results of the optical path based on the received optical signals. In this instance, the intensity of the optical signals scattered or reflected from the optical path is very small. For example, light subjected to Rayleigh-backscattering that is a representative optical scattering effect, is an optical signal that is attenuated by 35 dB compared to an input signal, and then transmitted to the OTDR signal transceiver unit 300 after reciprocating the optical path.

Accordingly, the intensity of the light received to the OTDR signal transceiver unit 300 may be smaller by 70 dB, than the intensity of the OTDR signal input along the optical path. Consequently, in order to increase the dynamic range of the OTDR, an optical receiver having an excellent reception performance should be used, but there is a physical limitation in the performance of the optical receiver. Accordingly, in order to solve this, the OTDR using a coded optical signal as the OTDR signal may be used. However, in this case, a process of calculating a signal-to-noise ratio in the OTDR is not used, and therefore there is a limitation when distinguishing signal and noise received from a range less than the reception sensitivity of the optical receiver.

In order to solve the above-described problem, in the present invention, the optical layer monitoring apparatus which uses a pulse coding scheme using a plurality of optical pulses and a signal processing algorithm while using the coded signal as the OTDR signal, is proposed.

Figure 6:
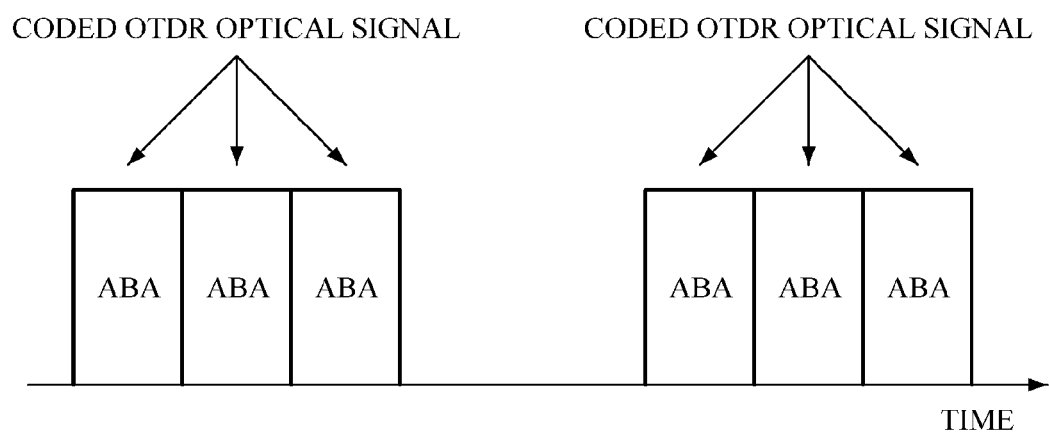
FIG. 6 is a reference diagram showing a method of improving reception sensitivity using a coded OTDR signal according to an embodiment of the present invention.

FIG. 6 is a reference diagram showing a method of improving reception sensitivity using a coded OTDR signal according to an embodiment of the present invention.

According to an embodiment, the OTDR signal transceiver unit 300 of the optical layer monitoring apparatus 30 transmits the OTDR signal along the optical path using a pulse coding scheme using a plurality of optical pulses different from each other while transmitting the OTDR signal in the form of optical pulses. In this case, the OTDR signal processing unit 302 converts the OTDR signal received to the OTDR signal transceiver unit 300 into an electrical signal, and then performs signal processing with respect to the converted electrical signal, thereby improving reception sensitivity.

According to another embodiment, the OTDR signal transceiver unit 300 may transmit the OTDR signal including a repeatedly coded code when using the pulse coding scheme. When repeatedly transmitting the OTDR signal including the coded code, the OTDR signal transceiver unit 300 may receive the OTDR signal reflected from the optical path, and the OTDR signal processing unit 302 may add three pulse trains having the same sign as a decoding gain according to the coding in the signal processing process of the received OTDR signal, and therefore probability in receiving of the signal may be increased, thereby improving reception sensitivity.

FIG. 6 shows an example of a case of repeatedly transmitting the coded OTDR signal. In this instance, there is no limitation in the number of repetitions of the coded OTDR signal.

As an example of the coded OTDR signal, a method of using a pseudo random noise code (PN code) may be used. As an example, when a code length of 511 is used, a coding gain of about 27 dB may be obtained, thereby increasing the dynamic range of the OTDR by 13.5 dB.

Figure 7A:
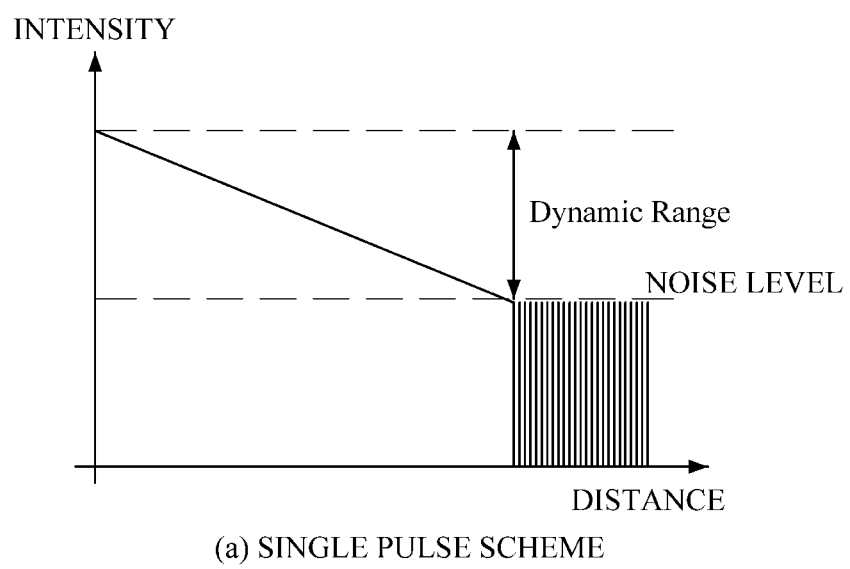
FIGS. 7A and 7B are reference diagrams showing OTDR measurement results expected when applying a PN code to an OTDR signal according to an embodiment of the present invention.
Figure 7B:
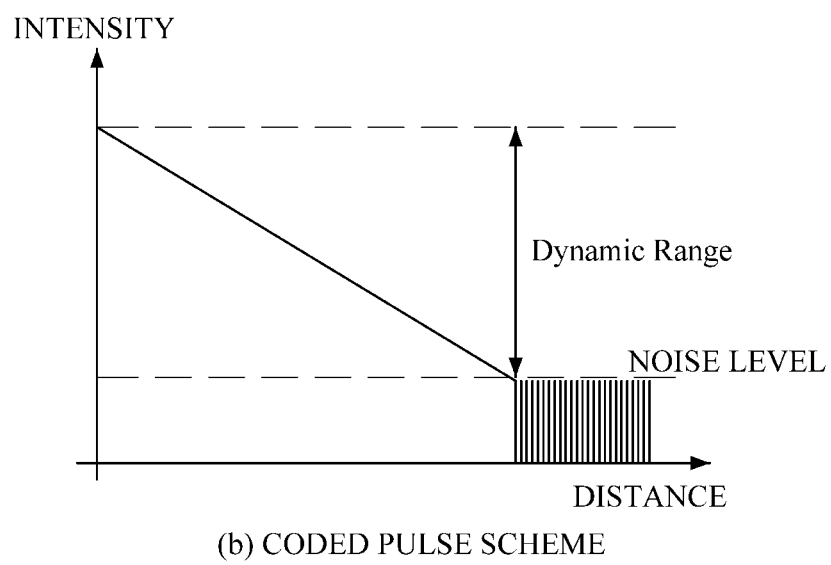

FIGS. 7A and 7B are reference diagrams showing OTDR measurement results expected when applying a PN code to an OTDR signal according to an embodiment of the present invention.

FIG. 7A is measurement results to be expected when operating the OTDR signal in a single pulse scheme, and FIG. 7B is measurement results to be expected when operating the OTDR signal in a coded pulse scheme. As shown in FIGS. 7A and 7B, in case (a) in which the OTDR using the coded pulse scheme is used, measured noise level is reduced, and therefore the dynamic range that is a major characteristic of the OTDR, is improved compared to case (b) in which the OTDR is not used.

Figure 8:
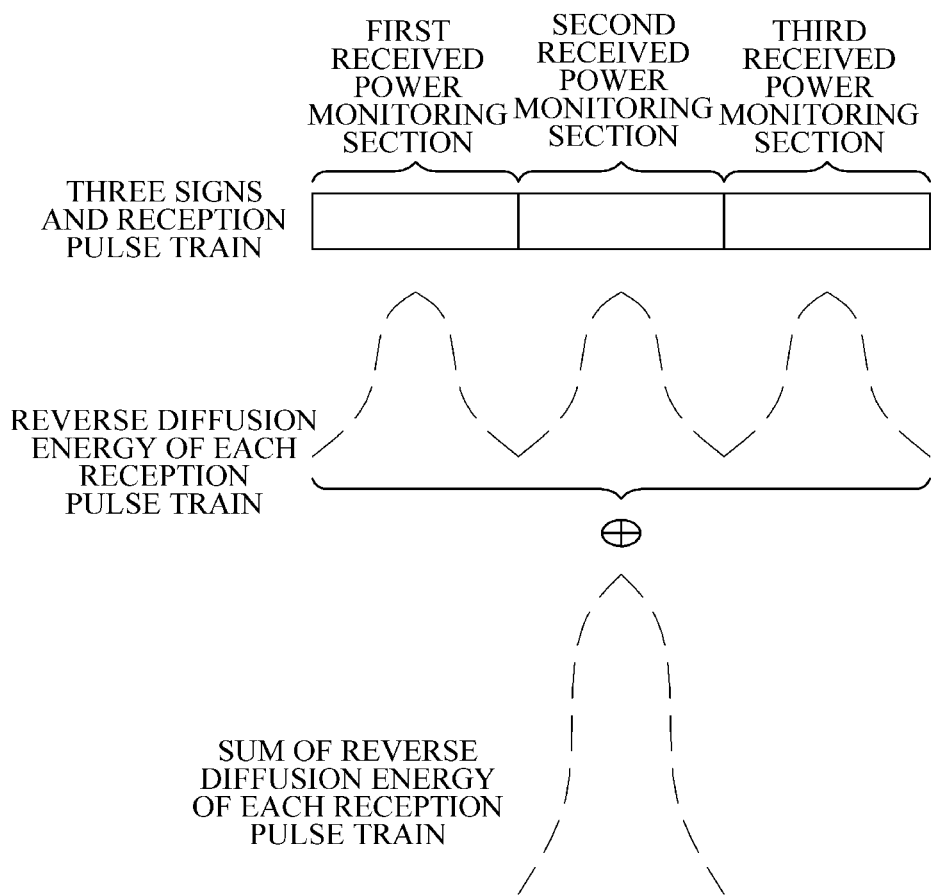
FIG. 8 is a reference diagram showing a method of improving reception sensitivity using an addition process according to an embodiment of the present invention.

FIG. 8 is a reference diagram showing a method of improving reception sensitivity using an addition process according to an embodiment of the present invention.

According to an embodiment, in order to improve monitoring performance of the optical layer monitoring apparatus 30, the OTDR signal processing unit 302 distributes and measures a received power monitoring section of the OTDR signal received from the OTDR signal transceiver unit 300, and adds the measurement results.

For example, as shown in FIG. 8, in a process of transmitting three coded pulses as the OTDR signal and receiving the OTDR signal reflected from the optical path, reverse diffusion energy for each of the received poser monitoring sections may be obtained. The same noise component is inserted in the reverse diffusion energy for each section, but a value of the reverse diffusion energy obtained by adding the three received power sections is increased by a multiplier of the square, and therefore it is useful for obtaining a peak value. Therefore, monitoring performance may be improved.

Figure 9:
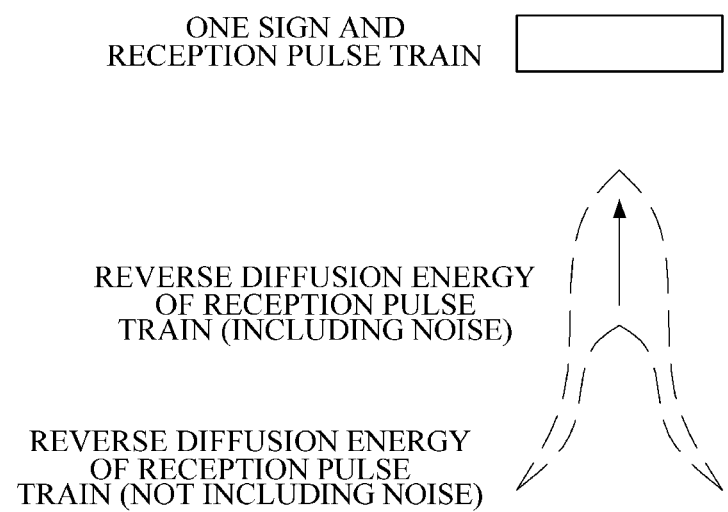
FIG. 9 is a reference diagram showing a method of improving reception sensitivity by calculating a signal-to-noise ratio in accordance with noises according to an embodiment of the present invention.

FIG. 9 is a reference diagram showing a method of improving reception sensitivity by calculating a signal-to-noise ratio in accordance with noises according to an embodiment of the present invention.

According to an embodiment, in order to improve monitoring performance of the optical layer monitoring apparatus 30, the OTDR signal transceiver unit 300 transmits and receives the OTDR signal subjected to spread coding, and the OTDR signal processing unit 302 calculates a signal-to-noise ratio of a spread code from the OTDR signal reflected from the optical path and allows the calculated ratio to be included in the received power to thereby calculate reception sensitivity.

Referring to FIG. 9, as ideal reverse diffusion energy, a large energy may be obtained when noise is not included in the energy. In contrast, when noise is included in the energy, the noise may affect the reverse diffusion energy, and therefore a signal-to-noise ratio as a ratio of the ideal reverse diffusion energy and actual calculated energy may be calculated. Meanwhile, the above-described method of calculating the signal-to-noise ratio is merely an example to help the understanding of the present invention, and other various methods may be used.

Figure 10:
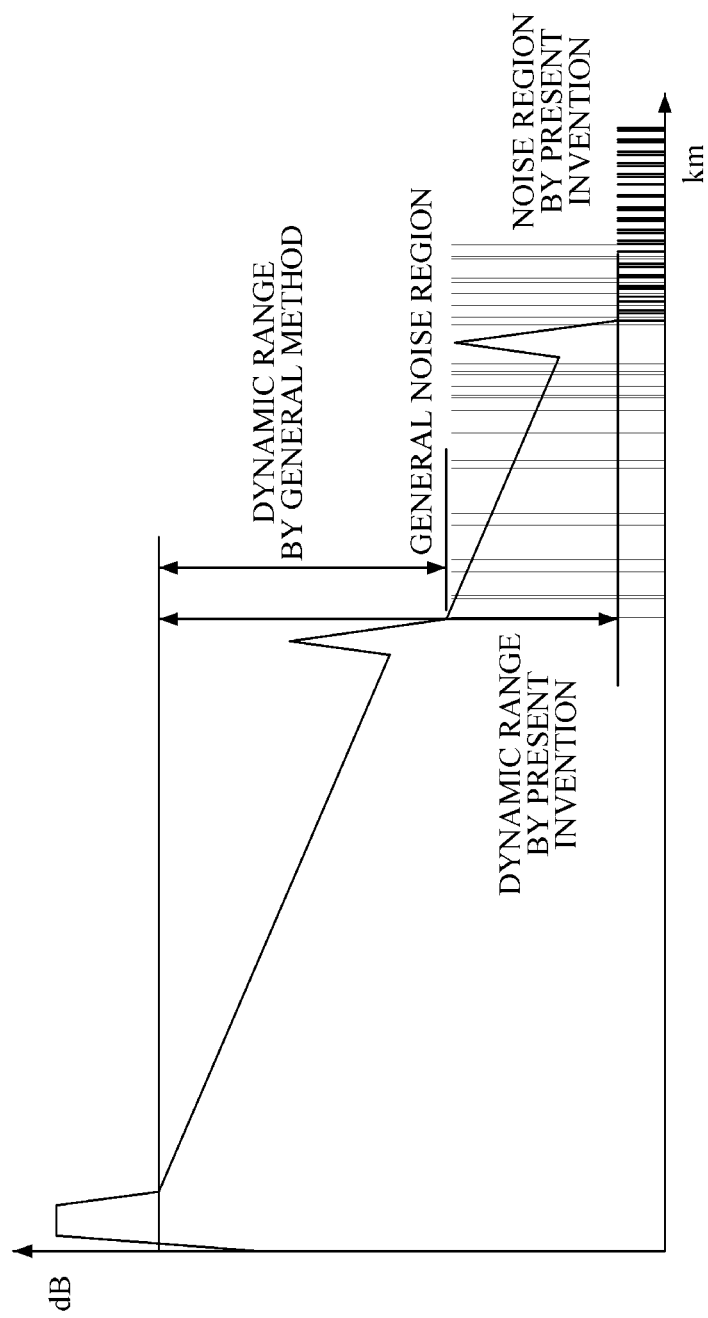
FIG. 10 is a reference diagram showing an example of optical path monitoring results measured by an optical layer monitoring apparatus, and optical path monitoring results measured by a general OTDR when using an OTDR signal in a spread code resistant to noise according to an embodiment of the present invention.

FIG. 10 is a reference diagram showing an example of optical path monitoring results measured by the optical layer monitoring apparatus 30, and optical path monitoring results measured by a general OTDR when using an OTDR signal in a spread code resistant to noise according to an embodiment of the present invention.

Referring to FIG. 10, it can be found that, when using the OTDR signal in the spread code resistant to noise, the dynamic range is increased, and a range of a noise region is reduced.

Hereinafter, technology for improving monitoring performance of an optical layer monitoring apparatus by increasing resolution according to an embodiment of the present invention will be described with reference to FIGS. 11 and 12.

Figure 11:
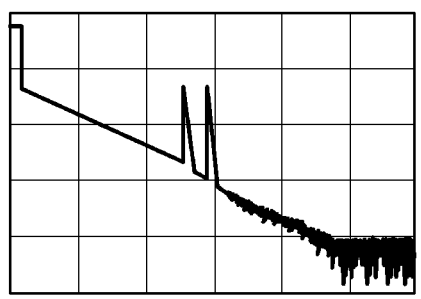
FIG. 11 is a reference diagram showing comparison between monitoring results (a) by an optical layer monitoring apparatus having high resolution and monitoring results (b) by an optical layer monitoring apparatus having low resolution.
Figure 11:

FIG. 11 is a reference diagram showing comparison between monitoring results (a) by an optical layer monitoring apparatus having high resolution and monitoring results (b) by an optical layer monitoring apparatus having low resolution.

The resolution of the optical layer monitoring apparatus is an important performance indicator for distinguishing a distance between reflection points positioned along the optical path. The resolution of the OTDR is determined by a pulse width of the OTDR signal. In order to improve the resolution of the OTDR, it is preferable to reduce the purse width of the OTDR signal, but in this case, the optical intensity of the OTDR signal received to the OTDR signal transceiver unit 300 is reduced, and the dynamic range of the OTDR is relatively reduced. In contrast, in order to improve the dynamic range, when increasing the pulse width of the OTDR signal, the resolution is reduced. In order to overcome this, the OTDR signal with a narrow pulse width is used, and the OTDR signal processing unit may sample the OTDR signal received at a high speed, and at the same time use a high-order sampling bit.

According to this method, the OTDR signal processing unit that processes the received OTDR signal at a high speed, is required.

According to the present invention, in order to improve the resolution of the OTDR even without using a high-speed signal processing unit to process the OTDR signal converted into an electrical signal, the optical layer monitoring apparatus 30 using the OTDR signal processing unit 302 to which a reverse diffusion accumulation peak-calculating algorithm and a super resolution algorithm are applied is proposed.

Figure 12:
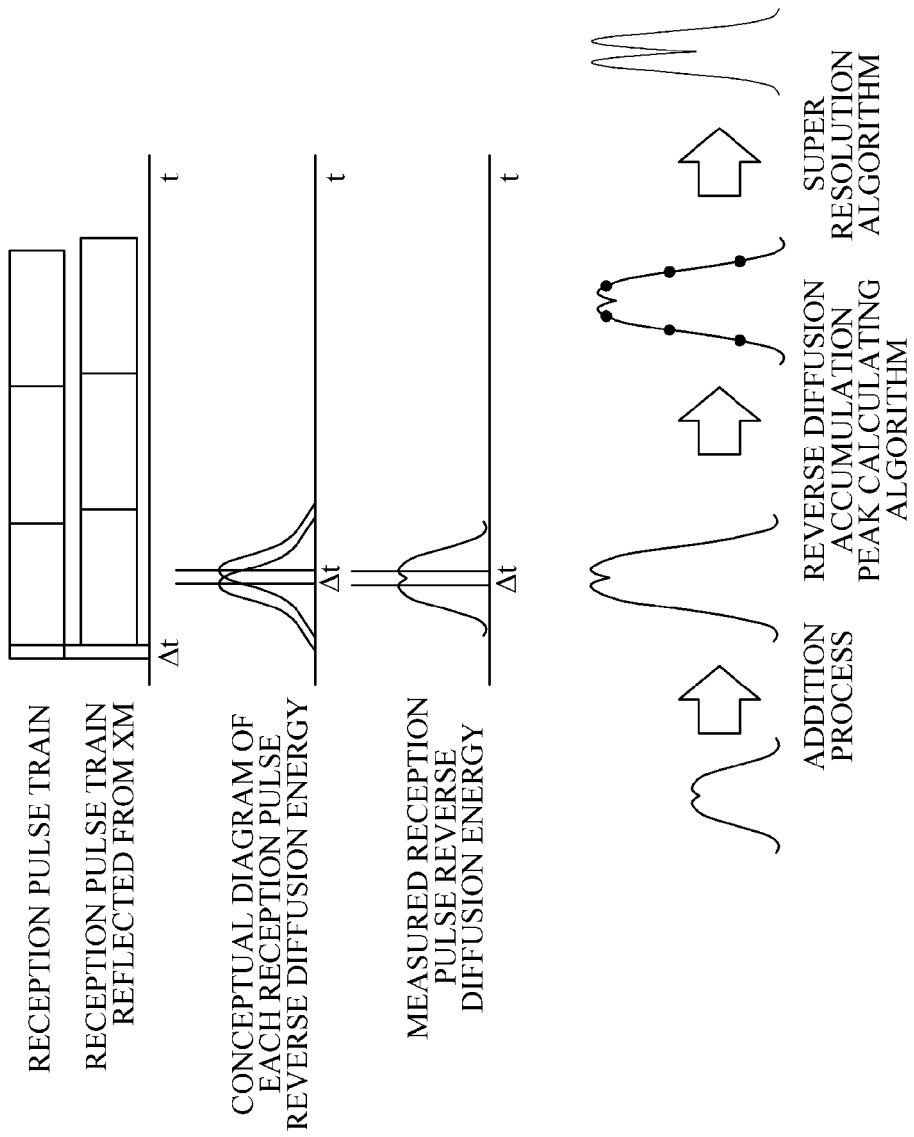
FIG. 12 is a reference diagram showing results obtained by applying algorithms different from each other for each process for improving resolution of an optical layer monitoring apparatus according to an embodiment of the present invention.

FIG. 12 is a reference diagram showing results obtained by applying algorithms different from each other for each process for improving resolution of the optical layer monitoring apparatus 30 according to an embodiment of the present invention.

The OTDR signal processing unit 302 distributes and measures a received power monitoring section so as to improve resolution, and performs an addition process. In this instance, maximum peak points of reverse diffusion energies of two signals reflected from the optical path are adjacent to each other on a curved line of the added diffusion energy, and therefore it is difficult to distinguish the maximum peak points of the two signals. Therefore, the two adjacent peak points are determined by sampling the added energies, and then reception pulse trains are decomposed by applying the super resolution algorithm. In this case, each peak point may be accurately distinguished, and therefore the reflected two signals may be distinguished. Accordingly, through this method, it is possible to accurately distinguish adjacent reflection points.

As described above, according to the embodiments of the present invention, by using the optical layer monitoring apparatus having improved performance, it is possible to continuously detect distortion or attenuation along an optical path, and to quickly recover from the distortion or attenuation along the optical path when distortion or attenuation is detected.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical layer monitoring apparatus in a passive optical network (PON), comprising:
   an optical time domain reflectometer (OTDR) signal transceiver unit that transmits an OTDR signal that is a monitoring signal to an optical path, and receives the OTDR signal backscattered or reflected from the optical path; and
   an OTDR signal processing unit that distributes a received power monitoring section of the received OTDR signal, measures reverse diffusion energy of each of reception pulse trains for each received power monitoring section, and adds the measured reverse diffusion energy of each of the reception pulse trains, while processing the OTDR signal transmitted or received through the OTDR signal transceiver unit,
   wherein the OTDR signal processing unit determines an adjacent peak point by sampling the added reverse diffusion energy of each of the reception pulse trains, and decomposes the reception pulse trains with reference to the determined adjacent peak point.

2. The optical layer monitoring apparatus according to claim 1, wherein the OTDR signal transceiver unit transmits the OTDR signal that is encoded using a pulse coding scheme using a plurality of optical pulses different from each other while transmitting the OTDR signal in the form of optical pulses along the optical path, thereby increasing reception sensitivity of the OTDR signal received from the optical path.

3. The optical layer monitoring apparatus according to claim 2, wherein the OTDR signal transceiver unit repeatedly transmits, along the optical path, the OTDR signal including a coded code when using the pulse coding scheme.

4. The optical layer monitoring apparatus according to claim 1, wherein the OTDR signal transceiver unit transmits the OTDR signal subjected to spread coding along the optical path, and the OTDR signal processing unit monitors received power by calculating a signal-to-noise ratio of a spread code from the OTDR signal received through the optical path.

5. The optical layer monitoring apparatus according to claim 1, wherein the optical layer monitoring apparatus is positioned inside an optical transmission apparatus of a network service provider including an optical transceiver unit for transmitting and receiving an optical signal, and a data signal processing unit for processing the optical signal including a data signal transmitted and received through the optical transceiver unit, without a change in a structure of the data signal processing unit.

6. The optical layer monitoring apparatus according to claim 5, wherein the OTDR signal transceiver unit is positioned inside the optical transceiver unit.

7. The optical layer monitoring apparatus according to claim 6, wherein the OTDR signal transceiver unit and the OTDR signal processing unit are connected with each other through the data signal processing unit, and an optical filter unit formed in the optical transceiver unit multiplexes wavelengths of optical signals transmitted through the data signal transceiver unit and the OTDR signal transceiver unit, and then transmits the wavelength multiplexed signals along the optical path.

8. The optical layer monitoring apparatus according to claim 5, wherein the OTDR signal transceiver unit and the OTDR signal processing unit are positioned inside the optical transceiver unit, and an optical filter unit formed in the optical transceiver unit multiplexes wavelengths of optical signals transmitted through the data signal transceiver unit and the OTDR signal transceiver unit, and then transmits the wavelength multiplexed signals along the optical path.

9. The optical layer monitoring apparatus according to claim 5, wherein the data signal processing unit is a media access controller (MAC).

10. The optical layer monitoring apparatus according to claim 1, wherein the OTDR signal processing unit is integrated into a semiconductor chip in order to minimize size.

11. The optical layer monitoring apparatus according to claim 1, wherein an optical element used in the OTDR signal transceiver unit is integrated into an optical integrated circuit.

12. An optical layer monitoring method of an optical layer monitoring apparatus in a PON, comprising:
    transmitting an OTDR signal along an optical line, and receiving the OTDR signal backscattered or reflected from the optical path; and
    distributing a received power monitoring section of the received OTDR signal, measuring reverse diffusion energy of each of reception pulse trains for each received power monitoring section, and adding the measured reverse diffusion energy of each of the reception pulse trains, while processing the received OTDR signal,
    wherein the processing of the OTDR signal further includes determining an adjacent peak point by sampling the added reverse diffusion energy of each of the reception pulse trains, and decomposing the reception pulse trains with reference to the determined adjacent peak point.

13. The optical layer monitoring method according to claim 12, wherein the transmitting and the receiving of the OTDR signal includes transmitting the OTDR signal that is encoded using a pulse coding scheme using a plurality of optical pulses different from each other while transmitting the OTDR signal in the form of optical pulses along the optical path, thereby increasing reception sensitivity of the OTDR signal received from the optical path.

14. The optical layer monitoring method according to claim 12, wherein the transmitting and the receiving of the OTDR signal includes transmitting the OTDR signal subjected to spread coding along the optical path, and monitoring received power by calculating a signal-to-noise ratio of a spread code from the OTDR signal received through the optical path.

* * * * *